United States Patent Office 3,011,859
Patented Dec. 5, 1961

3,011,859
MANUFACTURE OF POLYMERIC SHAPED OBJECTS BY WET SPINNING
John P. Knudsen, Decatur, Ala., assignor to The Chemstrand Corporation, Decatur, Ala., a corporation of Delaware
No Drawing. Filed Aug. 18, 1958, Ser. No. 755,379
5 Claims. (Cl. 18—54)

This invention relates to the manufacture of shaped objects from halogen-containing polymers and in particular to a method for wet spinning chlorine-containing polymers and a new coagulating bath composition useful in the production of said shaped objects.

Although the process of this invention is generally applicable to the production of any shaped object from halogen-containing polymers, such as fibers, filaments, bristles, tubings, films, pellicles, and the like, for convenience reference is made herein mainly to the production of filaments from a polymer containing polymerized vinyl chloride and/or vinylidene chloride.

The halogen-containing polymers found most useful in the practice of this invention are polyvinyl chloride and polyvinylidene chloride, as well as copolymers and terpolymers containing at least 50 percent vinyl chloride or vinylidene chloride, which polymers may also contain at most 50 percent of other mono-olefinic monomers containing the >C=C< groups which are copolymerizable therewith. Useful polymers or copolymers are those which contain 100 percent vinyl chloride or vinylidene chloride, or copolymers of the two in any proportion, or copolymers of vinyl chloride and/or vinylidene chloride which contain 50 percent or less of other copolymerizable mono-olefinic monomers including vinyl esters of monocarboxylic acids such as vinyl acetate; other vinyl halides; the lower dialkyl esters of maleic and fumaric acid such as the dimethyl, diethyl, and dibutyl esters; acrylonitrile; acrylic and methacrylic acid esters such as methyl acrylate, butyl acrylate, octyl acrylate, methyl methacrylate, butyl methacrylate and the like; vinyl alkyl esters such as vinyl ethyl ether and vinyl isobutyl ether; isobutylene; isopropenyl acetate; alkyl vinyl ketones; and other mono-olefinic monomers which are copolymerizable with vinyl chloride and vinylidene chloride. More preferred are polyvinyl chloride or polyvinylidene chloride or copolymers of the type disclosed above which contain at least about 90 percent by weight vinyl chloride and/or vinylidene chloride and less than about 10 percent of other copolymerizable mono-olefinic monomers.

Many of the more readily available monomers for polymerization with vinyl chloride or vinylidene chloride form copolymers which are not reactive with the dyestuffs and may therefore be impossible or difficult to dye by conventional techniques. Accordingly, these non-dyeable fiber-forming copolymers may be blended with polymers or copolymers which are in themselves more dye-receptive by reason of their physical structure or by reason of the presence of functional groups which are chemically reactive with the dyestuffs, whereby the dyestuff is permanently bonded to the polymer in a manner which lends resistance to the usual laundering and dry cleaning procedures. Suitable blending polymers may be polyvinylpyrrolidone, polyvinylpyridine, polymers of alkyl-substituted vinylpyridine, polymers of other vinyl-substituted N-heterocyclic compounds, the copolymers of the various vinyl-substituted N-heterocyclic compounds and other copolymerizable monomers.

In the field of synthetic fibers, the fiber- and film-forming properties of polyvinyl chloride and polyvinylidene chloride have long been recognized. While these chlorine-containing polymers offer an attractive combination of cost, mechanical properties, and appearance, filaments produced therefrom have the drawback of having extreme shrinkage at temperatures above 80° C.; and if stabilized against shrinkage, have very low tenacities and extremely high elongations which limit their use in the textile articles. Ways to ameliorate the aforementioned undesirable features have not heretofore been too successful and consequently such filaments do not find extensive use in the field of textiles.

Filaments composed of chlorine-containing polymers are produced commercially by the dry spinning method, by the melt spinning method, or by the wet spinning method. In the latter method with which the present invention is concerned a chlorine-containing polymer is first dissolved in a suitable solvent. The resulting solution of polymer is extruded through a spinneret submerged in a solution capable of coagulating the polymer. The spinneret is provided with orifices, the diameter and number of which depend on the ultimate filament denier and the number of filaments produced. During their passage through the coagulating bath, the filaments may be given a stretch to diminish the diameter thereof. This stretch is called the spinning or jet stretch.

In many respects the coagulation of the polymer-containing solutions is the most important step in the wet spinning process, for whatever structure that is established in the filaments during coagulation can only be modified during further processing into finished filaments. Initial weaknesses or inhomogeneities established during coagulation frequently persist as faults in the final product. Consequently, the composition of the coagulating bath influences considerably the mechanical properties and appearance of the ultimate filaments.

Ordinarily, in a wet spinning operation coagulation is accomplished by extruding the polymer solution into an aqueous bath or other non-solvent bath sometimes containing a percentage of solvent or dissolved salt. During coagulation there is an inward diffusion of bath liquid into the coagulating filaments and a corresponding outward movement of solvent into the coagulating bath. By employing a normal aqueous bath composition, the solvent and bath liquid interchange in such a manner that the resulting filament may contain voids along its length and frequently may have a coarse, spongelike structure that can be clearly seen with an optical phase microscope. Filaments containing these voids or unfilled spaces do not possess the requisite physical properties desired for some end uses. For example, such filaments may exhibit lower tenacity and lower abrasion resistance than filaments not containing voids.

To collapse the voids, the filaments during the aftertreatment thereof are given a high degree of stretch and then dried at a rather high temperature under tension thereby forming a more dense, collapsed filamentary structure. These highly stretched fibers shrink rapidly when heated above 80° C. without tension and are normally subjected to a preshrinking operation before use.

It is an object of this invention to provide a new and useful method of wet spinning filaments of a chlorine-containing polymer that have improved physical properties, particularly in regard to tenacity, elongation and abrasion resistance. It is another object of this invention to provide a new and useful method of wet spinning filaments of a chlorine-containing polymer that possess improved thermal stability without the need of subjecting the filaments to a shrinking operation. Other objects and advantages will become apparent from the following detailed description.

In general these objects are accomplished by spinning a solution of a chlorine-containing polymer into a coagulating bath composed of polyalkylene glycol having a molecular weight of at least 200 to form a filament and withdrawing the resulting filament from the spin bath. The chlorine-containing polymer is a polymer containing at least 50 percent polymerized vinyl chloride and/or vinylidene chloride.

Filaments so spun have higher tenacity, lower elongation, and better abrasion resistance than comparable filaments spun in an aqueous coagulating bath. It has been found that the polyalkylene glycol bath extracts a higher percentage of initial solvent from the yarn than does a water coagulating bath and yields a denser, more collapsed yarn at the point the filaments are withdrawn from the coagulating bath. The bath can be used at temperatures in excess of 100° C. and permits an almost unlimited jet stretch. The filaments produced by the use of polyalkylene glycol bath are very plastic and fluid in the bath and may have a tendency to adhere to each other and filamentary bundles of relatively high total denier, such as a tow, can not normally be satisfactorily drawn horizontally through the bath. The tension necessary to pull such a bundle through the bath and to prevent the filaments from becoming entangled among themselves may extenuate the filaments to an undesirable extent. Therefore, it has been found that best results are obtained by arranging the spinneret and withdrawal means so that the extruded filaments are drafted substantially upwardly through the bath. Furthermore, the freshly spun filaments may be sensitive to turbulences in the coagulating bath. Any large motion of the liquid adjacent the filaments that is not concurrent with the direction of filament removal may give rise to spinning difficulties. It has been found that spinning tubes, shields, or other like spinning arrangements that minimize the objectionable turbulences in the bath or that induce the flow of the coagulating bath to be concurrent with the direction that the filaments move are desirable.

After withdrawal from the coagulating bath the filaments of the present invention are directed through a washing medium where residual solvent and coagulating liquid are removed therefrom and given an afterstretch to orient the polymer molecules. The afterstretch of the filaments can be accomplished by any suitable means which will effect the necessary extension; and it can be accomplished by passing the filaments between two driven thread advancing devices rotating at different, predetermined peripheral speeds. The filaments during their passage between said devices are preferably passed through a hot water bath so that they are washed and stretched simultaneously. It is to be noted that the conditions of the water bath where the stretching is accomplished may be regulated so that it is possible to impart an afterstretch to the filaments to the extent of eight times or more.

Filaments produced according to the present invention pick up less water in the washing step, consequently carrying less water with them to the driers, and therefore can be dried more rapidly or at lower temperatures than ordinary wet spun filaments.

Furthermore, the filaments show less tendency to shrink at elevated temperatures and can be used for textile purposes without recourse to the aforesaid shrinking operation. The surface of the filament is smooth and free from the pronounced crenulations which characterize normal wet spun filaments. Moreover, the filaments have a soft silky hand or feel even without a finish normally applied thereto and require added finish only for anti-static protection.

Although it is not fully understood how the coagulating bath contributes to the formation of the improved fiber structure, it is believed that a rapid efflux of solvent out of as compared to bath inflow into the coagulating filament minimizes the formation of the aforedescribed porous structure, a denser and more compact filament resulting in the coagulating bath.

The solutions to be spun in the coagulating bath composition of the present invention may be prepared by dissolving a chlorine-containing polymer described above in solvents conventionally used in the art. Suitable solvents include, for example, cyclohexanone, methyl cyclohexanone, nitrobenzene, tetrahydrofuran, isophorone, mesityl oxide, N,N-dimethylformamide, N,N-dimethylacetamide, dimethyl sulfoxide, dimethyl sulfone, and the like and give solutions of high molecular weight polymer without substantial modification by agitation at room temperature. It will be appreciated that a solution containing a higher percentage of polymer can usually be prepared by using higher temperatures. The concentration of the chlorine-containing polymer varies inversely with the molecular weight of the polymer. In forming the solution the polymer is best employed in the form of a dry powder and the solution or spinning "dope" may be made by combining the powder with the requisite quantity of solvent in a mixing device, preferably provided with means for controlling the temperature. The time required for mixing to obtain a useful solution is adjusted according to the ease of dissolution. The resulting dope is usually a clear, viscous liquid. Ordinarily, for spinning purposes, a solution containing at least 10 percent of the polymer by weight is desirable.

The chlorine-containing polymer preferably possesses a molecular weight of at least 10,000 and preferably between about 25,000 and 150,000, as calculated from viscosity measurements by the Staudinger equation:

$$\text{Molecular weight} = \frac{N_{sp}}{K_m C}$$

where:

$$K_m = 1.5 \times 10^{-4}$$

$$N_{sp} = \text{specific viscosity} = \frac{\text{viscosity of solution}}{\text{viscosity of solvent}} - 1$$

and $C$ = concentration of the solution expressed as the number of moles of the monomer (calculated) per liter of solution.

The polymers useful in the practice of the present invention may be prepared by any conventional polymerization procedure, such as mass polymerization methods, solution polymerization methods, or aqueous emulsion procedures. The preferred practice utilizes suspension polymerization wherein the polymer is prepared in finely divided form for immediate use in the fiber fabrication operations.

As pointed out above, the improvement herein is obtained by spinning the polymer solution into a bath composed of polyalkylene glycol. The term "polyalkylene glycol" as used throughout the specification and claims refers to polyethers which may be derived from alkylene oxides or glycols or from other heterocyclic ethers such as dioxolane, and which may be represented by the formula $HO(RO)_nH$ in which R stands for an alkylene radical such as methylene, ethylene, propylene, etc., and $n$ is an integer of at least four. It will be appreciated that the polyglycol may contain inert substituents; for example, methoxypolyethylene glycol may be employed. Not all of the alkylene radicals present need be the same. Glycols containing a mixture of radicals such as in block polymers and copolymers are also useful in practice of this invention. Similarly, mixtures of various polyglycols of differing composition or molecular weight can be employed. The glycols which are useful in the process of this invention have molecular weights of at least 200 and may have molecular weights as high as 6000. The preferred glycols are the polyethylene glycols particularly those having molecular weights of 600–2000. These glycols as just defined are either viscous liquids or waxy solids at room temperature. However, they become less viscous at higher temperatures and permit spinning at these temperatures. Although wide variations in the coagulating bath temperatures are permitted, it is preferred that the temperature be of the order of 50 to 150° C. depending on which glycol is employed.

During spinning the solvent concentration will build up in the coagulating bath. Fresh coagulating bath composition should be supplied to the coagulating bath when the solvent concentration therein becomes excessively high, with the spent composition being recovered by conventional methods. Obviously, the concentration of the solvent in the bath must be such that the polymer will precipitate therein. Certain solvents may be used in higher concentrations than others. Up to 20 percent concentration by weight, when N,N-dimethylacetamide or N,N-dimethylformamide is used as the solvent, can ordinarily be tolerated in the spin bath without adversely affecting the filament appearance or properties.

Although the coagulating bath is preferably free of water, nevertheless, water may be present in the coagulating bath in minor amounts without inducing the formation of inferior filaments. For best results it is necessary to maintain the water concentration in the coagulating bath below 10 percent. If greater amounts of water are present, inferior filaments may be produced.

Quite unexpectedly the present process enables one to produce filaments of very fine deniers. Owing to the high jet stretch permitted by the process as pointed out above, filaments having individual deniers of 0.25 can be successfully spun.

Additives such as delusterants, coloring pigments, antioxidants, plasticizers, and other like modifying agents may be incorporated in the polymer solution without departing from the scope of the present invention. The vinyl chloride polymer and/or vinylidene chloride polymer will normally contain a stabilizer as is well-known. Representative stabilizers are dibutyl tin dilaurate, tin mercaptide, epoxided fatty acid esters, dibasic lead phthalate, lead carbonate, cadmium and barium compounds, and the like.

The following examples in which parts and percentages are given by weight unless otherwise specified illustrate preferred methods of employing the coagulating bath composition in the manufacture of commercially satifactory filaments. The invention is not to be limited by the details set forth in the examples.

EXAMPLE I

A 20 percent solution of a copolymer containing 96 percent vinyl chloride and 4 percent vinyl acetate was prepared by intimately mixing the copolymer in powdered form with the solvent, N,N-dimethylacetamide, until a clear liquid resulted. One percent of the stabilizer, dibutyl tin dilaurate, was incorporated in the resulting solution. The temperature at which the dissolving was accomplished was between 85° and 90° C. The resulting solution was cooled to a temperature of 50° C., filtered, and extruded through a spinneret submerged in a coagulating bath containing polyethylene glycol having an average molecular weight of 1000 and maintained at 80° C. The filament so formed was drawn upwardly through the bath for a distance of 18 inches. Thereafter, the filament was withdrawn from the bath and wrapped several times around two vertically spaced, driven rotating cans over which water at a temperature of 70° C. was permitted to fall in an abundant quantity, whereby the filament was washed substantially free of solvent. The filament was directed through an elongated trough containing boiling water flowing counter-current with the direction of the movement of the filament and then wrapped around a driven can rotating at an increased, predetermined peripheral speed such that the filament was afterstretched 5.3 times in said trough. After being passed through a bath containing a yarn lubricant and anti-static agent and having a concentration of these materials such that the filament picked up during its travel therethrough a sufficient amount thereof to have good processability, the filament was directed around a series of rotating drying cans having a temperature of 118° C. to dry the filament. The finished filament had a denier of 2.0, an elongation of 18 percent, and a tenacity of 4.7 grams per denier.

A series of spinnings were conducted using the same solution of this example and under the same conditions except that various bath temperatures, afterstretches, drying temperatures, and filament deniers were employed. The results of these spinnings are tabulated below in Table I.

*Table I*

| No. | Bath Temperature, °C. | Afterstretch | Drier Temperature, °C. | Den. (d.p.f.) | Elong., Percent | Ten., g./den. |
|---|---|---|---|---|---|---|
| 1 | 70 | 3.7× | 118 | 3.3 | 23 | 2.8 |
| 2 | 90 | 4.5× | 118 | 12.0 | 16 | 2.8 |
| 3 | 90 | 4.5× | 118 | 14.3 | 12 | 2.0 |
| 4 | 100 | 4.5× | 122 | 3.0 | 20 | 4.4 |
| 5 | 100 | 3.0× | 122 | 14.7 | 17 | 1.6 |

While there are definite variations in the physical properties which appear to be related to stretch, filament denier, or both of these factors, it is interesting to note that high tenacity values were obtained without difficulty. The filaments were completely collapsed and had a good degree of whiteness. It was found that the filaments had a brightness of 78.7, a purity of 5.5, and a dominant wave length of 573 as determined by standard reflectance tests using a General Electric spectrophotometer.

EXAMPLE II

The copolymer of 96 percent vinyl chloride and 4 percent vinyl acetate was blended in equal amounts with a copolymer blend compound of 90 percent of a copolymer of 97 percent acrylonitrile and 3 percent vinyl acetate and 10 percent of a copolymer of 50 percent acrylonitrile and 50 percent 2-methyl-5-vinylpyridine. The resulting blend of polymers was dissolved in N,N-dimethylacetamide to form a 20 percent solution. One half of one percent of the stabilizer, dibutyl tin dilaurate, was incorporated in the solution.

The solution was spun into a coagulating bath containing polyethylene glycol having a molecular weight of 1000 and aftertreated under similar conditions described in Example I except that various afterstretches were imparted to the resulting filament. These stretches, together with the physical properties of the filament, are given below in Table II.

*Table II*

| No. | Stretch | Filament Denier | Elongation, Percent | Tenacity, g./den. |
|---|---|---|---|---|
| 1 | 6.0× | 1.8 | 23 | 3.0 |
| 2 | 6.0× | 3.1 | 25 | 3.1 |
| 3 | 4.5× | 6.2 | 40 | 2.5 |
| 4 | 6.0× | 16.7 | 30 | 2.3 |
| 5 | 7.5× | 13.5 | 24 | 2.6 |

EXAMPLE III

Sixty parts of the copolymer of 96 percent vinyl chloride and 4 percent vinyl acetate was blended with 40 parts of a copolymer blend composed of 90 percent of a copolymer of 97 percent acrylonitrile and 3 percent vinyl acetate and 10 percent of a copolymer of 50 percent acrylonitrile and 50 percent 2-methyl-5-vinylpyridine. The resulting blend of polymers was dissolved in N,N-dimethylacetamide to form a 20 percent solution. One half of one percent of the stabilizer dibutyl tin dilaurate, was incorporated in the solution. The solution was spun into a coagulating bath containing polyethylene glycol having a molecular weight of 1000 and aftertreated under the conditions described in Example I except that the resulting filament was afterstretched 6.5 times. The filaments had an individual filament denier of 14.6, an elongation of 26 percent, and a tenacity of 2.4 g./den.

EXAMPLE IV

Eighty parts of the copolymer of 96 percent vinyl chloride and 4 percent vinyl acetate was blended with 20 parts of a copolymer blend composed of 90 percent of a copolymer of 97 percent acrylonitrile and 3 percent vinyl acetate and 10 percent of a copolymer of 50 percent acrylonitrile and 50 percent 2-methyl-5-vinylpyridine. The resulting blend of polymers was dissolved in N,N-dimethylacetamide to form a 20 percent solution. One percent of the stabilizer, dibutyl tin dilaurate, was incorporated in the solution. The solution was spun into a coagulating bath containing polyethylene glycol having a molecular weight of 1000 and aftertreated under the conditions described in Example I except that the resulting filaments were afterstretched 6.0 times. The filaments had an individual filament denier of 20.0, an elongation of 38 percent, and a tenacity of 2.8 g./den.

EXAMPLE V

A homopolymer of polyvinyl chloride was dissolved in N,N-dimethylacetamide to form a 20 percent solution of the polymer. One percent of the stabilizer, dibutyl tin dilaurate was incorporated in the resulting solution. This solution was spun into a bath containing polypropylene glycol having an average molecular weight of 425. The filament so produced was aftertreated as described in Example I except that the filament was afterstretched 4.4 times. Filaments of 3.0 and 15 denier were prepared and had tenacities of above 3.0 g./den. and elongations of 20–25 percent.

EXAMPLE VI

A copolymer prepared from a monomer mixture of 50 percent vinylidene chloride and 50 percent acrylonitrile was dissolved in N,N-dimethylacetamide to form a 20 percent solution of the polymer. The resulting solution was spun into a bath at 100° C. containing polyethylene glycol having an average molecular weight of 1000. The filament so produced was aftertreated as described in Example I except that the filament was afterstretched 4.0 times. The finished filament had a tenacity of 2.9 g./den. and an elongation of 28 percent.

EXAMPLE VII

Ninety-five parts of a homopolymer of vinyl chloride were blended with 5 parts of polyvinylpyrrolidone and the resulting blend was dissolved in N,N-dimethylacetamide to make a 20 percent solution of the polymer blend. One percent of dibutyl tin dilaurate was incorporated into the resulting solution. This solution was spun into a bath at 100° C. containing polyethylene glycol of molecular weight of 1000. The filament so produced was aftertreated as described in Example I except that the filament was afterstretched 3.0 times. The finished filament had an elongation of 28 percent and a tenacity of 2.1 g./den.

EXAMPLE VIII

Eighty parts of a homopolymer of vinyl chloride were blended with twenty parts of a homopolymer of acrylonitrile and dissolved in N,N-dimethylacetamide to make an 18 percent solution. One half of one percent of the stabilizer, dibutyl tin dilaurate, and 2 percent of the plasticizer, dioctyl phthalate, were incorporated into the resulting solution. The solution was spun into a bath containing polyethylene glycol having an average molecular weight of about 1000. The filament so produced was aftertreated as described in Example I except that the filament was afterstretched 6.0 times. The finished filament had a tenacity of 2.8 g./den. and an elongation of 38 percent.

By extruding solution of chlorine-containing polymers as described hereinabove into a coagulating bath composed of polyalkylene glycol of the type also described hereinabove, shaped objects having improved properties can be produced. The surface of filaments spun into the glycol bath is relatively smooth and substantially free from crenulations or crevices which characterize filaments spun in aqueous baths. Drying of the filaments produced in accordance with the present invention is readily accomplished and requires less heat (or drying time) than aqueous spin controls. This is due to the lower moisture content in and the denser structure of the filaments. Of importance is the fact that the filaments show less tendency to shrink at elevated temperature. Without being subjected to a shrinking operation, filaments can be produced that have comparable shrinkage to aqueous spun filaments that have been treated to reduce their shrinkage.

Many changes and modifications can be made without departing from the nature and spirit of the invention. It is to be understood, therefore, that the invention is not limited to the details described herein except as set forth in the appended claims.

What is claimed is:

1. A process for wet spinning filaments of a chlorine-containing polymer of a molecular weight of 10,000–150,000 having at least a 50 percent by weight of a polymerized monomer selected from the group consisting of vinyl chloride and vinylidine chloride and at most 50 percent by weight of mono-olefinic monomer copolymerized therewith which comprises the steps of extruding the said polymer dissolved in a solvent selected from the group consisting of N,N-dimethylformamide and N,N-dimethylacetamide through a spinneret submerged in a liquid coagulating bath composed of a polymeric ether having a molecular weight of 200–6000 and a general formula:

$$HO(RO)_nH$$

in which R is selected from the group of alkylene radicals consisting of ethylene and propylene and $n$ is an integer of at least four and indicative of the molecular weight of the polymeric ether and maintaining the temperature of the bath in the order of 50–150° C. and the concentration of the selected solvent for the said polymer so as not to exceed 20 percent by weight of the bath, thereby precipitating said polymer from its solution into the form of filaments.

2. The process of claim 1 including the steps of directing the filaments upwardly through the said bath, withdrawing the filaments from the said bath, passing the filaments through a hot water bath wherein the filaments are given a substantial stretch and thereafter drying the filaments.

3. The process of claim 2 wherein the solvent is N,N-dimethylacetamide.

4. The process of claim 3 wherein R in the formula of the polymeric ether is an ethylene radical.

5. The process of claim 3 wherein R in the formula of the polymeric ether is a propylene radical.

References Cited in the file of this patent

UNITED STATES PATENTS

| | | |
|---|---|---|
| 2,642,333 | Tomonari et al. | June 16, 1953 |
| 2,742,444 | Coover et al. | Apr. 17, 1956 |
| 2,761,855 | Ham | Sept. 4, 1956 |
| 2,773,114 | McAuslan | Dec. 4, 1956 |

OTHER REFERENCES

"Dermatological Applications of Carbowax Compounds and Polyethylene Glycols," published by Union Carbide and Carbon Corp. (N.Y.), 1951.